US012599216B1

(12) United States Patent

Barr, Sr.

(10) Patent No.: US 12,599,216 B1
(45) Date of Patent: Apr. 14, 2026

(54) NAIL CLIPPER

(71) Applicant: David W. Barr, Sr., Houston, TX (US)

(72) Inventor: David W. Barr, Sr., Houston, TX (US)

( * ) Notice: Subject to any disclaimer, the term of this patent is extended or adjusted under 35 U.S.C. 154(b) by 0 days.

(21) Appl. No.: 19/032,609

(22) Filed: Jan. 21, 2025

(51) Int. Cl.
 *A45D 29/02* (2006.01)
 *A01K 13/00* (2006.01)

(52) U.S. Cl.
 CPC .............. *A45D 29/02* (2013.01); *A01K 13/00* (2013.01); *A45D 2029/026* (2013.01)

(58) Field of Classification Search
 None
 See application file for complete search history.

(56) References Cited

U.S. PATENT DOCUMENTS

| | | | | |
|---|---|---|---|---|
| 3,555,675 | A | * | 1/1971 | Jurena ..................... A45D 29/02 30/28 |
| 5,357,677 | A | | 10/1994 | West |
| 6,220,251 | B1 | * | 4/2001 | Jeong ...................... A45D 29/18 30/28 |
| 6,553,592 | B2 | * | 4/2003 | Yang ....................... A45D 29/02 30/28 |
| 7,464,665 | B1 | * | 12/2008 | Rogers ................... A01K 13/00 119/600 |
| 9,486,051 | B1 | | 11/2016 | Robinson |
| 10,076,173 | B1 | * | 9/2018 | Kaidi ...................... A45D 29/02 |
| 2004/0200073 | A1 | | 10/2004 | Sakai |

| | | | |
|---|---|---|---|
| 2006/0174486 | A1 | 8/2006 | Domenge |
| 2009/0223055 | A1 | 9/2009 | Wendorf et al. |
| 2013/0212884 | A1 | 8/2013 | Doane |
| 2017/0164714 | A1 | 6/2017 | Little et al. |
| 2020/0237072 | A1 | 7/2020 | Doane |
| 2020/0315315 | A1 | 10/2020 | Paulsmeyer |
| 2022/0117370 | A1 | 4/2022 | Barnes et al. |

FOREIGN PATENT DOCUMENTS

| | | | | | |
|---|---|---|---|---|---|
| CN | 203446342 | U | * | 2/2014 | |
| DE | 202014105942 | U1 | * | 1/2015 | ............. A01K 13/00 |
| KR | 20170073402 | A | * | 6/2017 | ............. A45D 29/02 |

OTHER PUBLICATIONS

English translation of KR-20170073402-A, dated Jun. 28, 2017.*
English translation of DE-202014105942-U1, dated Jan. 12, 2015.*

* cited by examiner

*Primary Examiner* — Hwei-Siu C Payer

(74) *Attorney, Agent, or Firm* — Cramer Patent & Design, PLLC.; Aaron R. Cramer

(57) ABSTRACT

A nail clipper designed to improve user convenience and effectiveness, comprising a handle with a rear anti-slip surface and a finger grip area, connected to a nail clipping mechanism with two diamond-coated cutting blades for enhanced nail trimming. The nail clipper includes a trigger clip activator that operates along a travel path, a pull pin with a threaded section for blade spacing adjustment via a thumb-nut. A magnifying lens is mounted on a pivotable swing arm for visibility, and light-emitting diodes illuminate the cutting area. Additional features include integrated storage for a nail file and a manicure tool within the handle cavity. The invention addresses the need for a compact, multi-functional grooming tool with improved ergonomics and precision.

9 Claims, 6 Drawing Sheets

NAIL CLIPPER

RELATED APPLICATIONS

None.

FIELD OF THE DEVICE

The device of the present application falls under the category of personal grooming tools, specifically relating to nail clippers and associated accessories designed for trimming and grooming fingernails and toenails. The device integrates various features to enhance usability, precision, and convenience for a wide range of users, including those with reduced hand strength or mobility.

BACKGROUND OF THE DEVICE

Conventional nail clippers typically consist of a basic cutting mechanism that requires manual force for operation. While these devices are effective for general nail trimming, they often lack ergonomic features that would accommodate a broader range of users, particularly those with reduced hand strength or mobility, such as the elderly or individuals with disabilities. Traditional nail clippers also generally have a limited field of view and often require precise manual coordination, making it challenging to achieve accurate trimming, especially in low-light conditions. Furthermore, existing clippers rarely incorporate built-in features for magnification or illumination, which would allow users to see their nails more clearly during the cutting process. This absence of visual aids can lead to uneven cuts, discomfort, and even injury.

In addition, standard nail clippers usually do not include integrated storage or attachments for supplementary grooming tools, such as nail files or manicure tools, leading users to carry multiple items separately. This lack of integration not only diminishes convenience but also increases the risk of losing smaller accessories. For users who value efficiency and compactness, the need for multiple grooming tools can be cumbersome and inefficient.

While certain prior art attempts to address some of these issues, none combines all the critical features needed for a truly comprehensive solution. For instance, the nail clipper described in patent 20220117370 includes a sensor system for detecting specific materials in animal nails but lacks elements like ergonomic anti-slip grips, magnification, or integrated tool storage. Similarly, patent 20200315315 describes a clipper with an adjustable blade gap but does not offer features for improved visibility, such as lighting or magnification. The reverse actuated nail clipper in patent 20200237072 includes a mechanical advantage for increased cutting force, but it fails to integrate storage compartments or features for enhanced precision like those present in the current invention.

The CLIPPER GRIPPER ergonomic apparatus from patent 20170164714 supports individuals with limited dexterity by holding a conventional clipper in place, but it does not function as a standalone multi-functional clipper with built-in lighting or storage. Additionally, U.S. Pat. No. 9,486,051 describes a clipper with a spring-loaded hinge and elongated grips but lacks the ergonomic enhancements, illumination, and compact multi-tool storage capabilities of the present invention. Other prior art, such as patents 20130212884 and 20090223055, focus on clipper mechanisms with unique actuation methods but do not incorporate ergonomic anti-slip features, lighting, or internal tool storage, which are central to the present device's design.

Finally, designs such as those described in patents 20060174486 and 20040200073 focus on traditional nail clipping mechanisms, often incorporating only minor improvements to standard designs without addressing the broader issues of comfort, visibility, and tool integration. These references collectively lack the unique combination of a pistol grip handle with anti-slip surfaces, adjustable diamond-coated blades, integrated lighting, magnification, and built-in storage for auxiliary grooming tools that define the present invention.

The present device addresses these limitations by combining a nail clipping mechanism with ergonomic enhancements, such as anti-slip surfaces and a pistol grip design, which reduce hand fatigue and allow for extended use. Additionally, this device includes a magnifying lens and light-emitting diodes that provide illumination, allowing for improved visibility and precision during nail clipping. The integration of storage compartments for a nail file and a multi-tool within the handle further consolidates grooming functions into a single, portable device, providing users with a convenient and all-in-one solution for personal nail care. By incorporating these features, the present invention offers a novel, multi-functional approach to nail clipping, distinct from the prior art in its ability to deliver precision, comfort, and convenience within a single compact design.

SUMMARY OF THE DEVICE

Embodiments of the present disclosure may include a nail clipper with a handle that has a rear anti-slip surface and a finger grip area for enhanced user control. The nail clipper may also feature a clipping mechanism connected to the handle, consisting of two cutting blades coated with diamond powder to provide a smooth finish to clipped nails.

The nail clipper may include a trigger clip activator operatively connected to the clipping mechanism, configured to actuate along a first travel path. It may also have a pull pin with a slot for engaging the trigger clip activator, and a threaded section on the pull pin designed to receive a thumbnut for adjusting the spacing between the cutting blades. In some embodiments, the thumbnut may include a retaining cap to prevent unintentional removal and facilitate cutting adjustments for thicker nails or pet nails.

In certain embodiments, the nail clipper may feature a magnifying lens mounted in a lens frame positioned above the cutting blades to enhance visibility. The lens frame may be connected to a swing arm, which is attached to the handle at two pivot points. The swing arm may allow the lens frame to move along second and third travel paths, enabling adjustable positioning and compact storage of the lens frame and magnifying lens.

The nail clipper may also include a power switch mounted on the handle that controls a pair of light-emitting diodes positioned to illuminate the area around the cutting blades. A first diode may be located on the underside of the lens frame to illuminate the area below the magnifying lens, while a second diode may be positioned on the handle's sidewall for additional illumination of the cutting area.

In some embodiments, the trigger clip activator may feature a front anti-slip surface for improved user control during actuation, especially in wet conditions. The handle may have first and second storage locations for a nail file. The nail file itself may include a file shaft with various abrasive grit coatings for coarse to fine nail grooming, and the shaft may be equipped with concave surfaces and pointed edges to accommodate different nail thicknesses and grooming requirements.

Additionally, some embodiments may include a door located near the rear anti-slip surface, providing access to an internal cavity in the handle designed to store a manicure tool. This manicure tool may consist of a tool frame that houses multiple tools, each pivotably mounted via a third pivot point. These tools, which may include a coarse file, a medium file, a fine file, a pick tool, and a knife blade, may be interchangeable to provide various grooming functions.

In other embodiments, the trigger clip activator may rotate along a dual rotating travel path, allowing it to rest adjacent to the finger grip area for compact storage when the nail clipper is not in use. The nail clipper may also feature diamond-coated cutting blades configured to create decorative cuts on nails, with angled blades that provide a shearing action for softening and shaping cuts.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
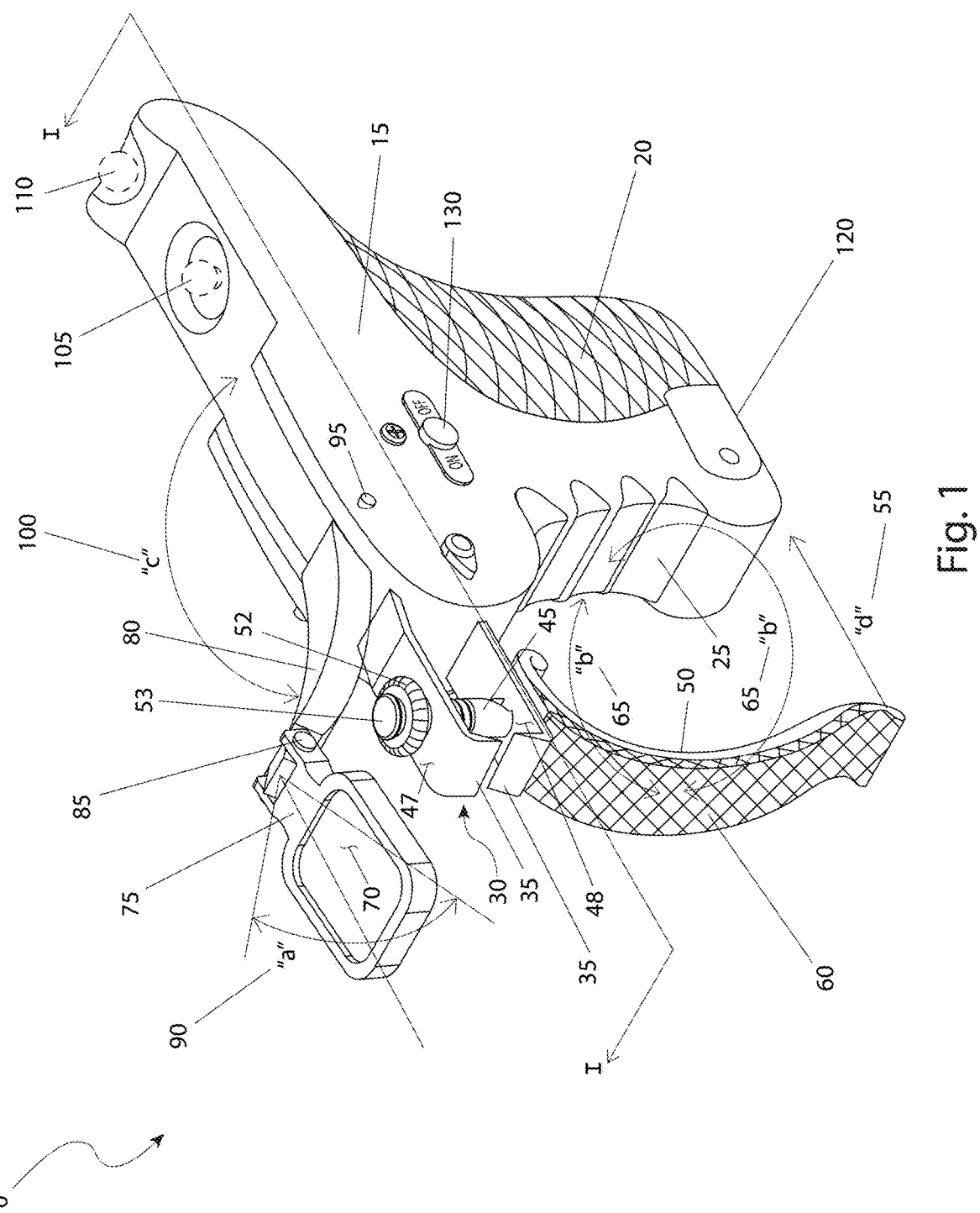
FIG. 1 is a perspective view of the nail clipper 10, according to the preferred embodiment of the present invention.

DESCRIPTIVE KEY 10 nail clipper
15 handle
20 rear anti-slip surface
25 finger grip area
30 nail clipping mechanism
35 cutting blade
40 diamond powder 45 pull pin
46 slot
47 upper arm
48 lower arm
50 trigger clip activator
51 threaded section
52 thumbnut
53 retaining cap
55 travel path "d"
60 front anti-slip surface
65 travel path "b"
70 magnifying lens
75 lens frame
80 swing arm
85 first pivot point
90 travel path "a"
95 second pivot point
100 travel path "c"
105 first file storage location
110 second file storage location
115 nail file
120 door
125 internal handle cavity
130 power switch
135 light-emitting diodes (LED's)
140 manicure tool
145 screw
150 manicure tool top view
155 tool frame
160 stored tool
165 deployed tool
170 third pivoting point
175 manicure tool side view
180 manicure tool end view
185 coarse file
190 medium file
195 fine file
200 pick tool
205 knife blade
210 file shaft
215 file handle
220 abrasive grit coating
225 concave surface
230 edge

DESCRIPTION OF THE PREFERRED EMBODIMENTS

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a perspective view of the nail clipper 10, according to the preferred embodiment of the present invention is disclosed. The nail clipper 10 provides a nail clipping mechanism 30 for human fingernails or toenails with features that enhance its usability and convenience. The nail clipper 10 provides for a main handle 15, envisioned to be manufactured from injection molded plastic, in the general shape of a pistol grip. The handle 15 can be made in a vast assortment of colors, designs, and styles to appeal to all ages and easily used by all sizes of hands. The handle 15 provides for a rear anti-slip surface 20 that contacts the user's palm area. A finger grip area 25 then completes the pistol grip arrangement in an ergonomic manner that is comfortable to use for long periods of time.

Figures 5A, 5B, 5C:
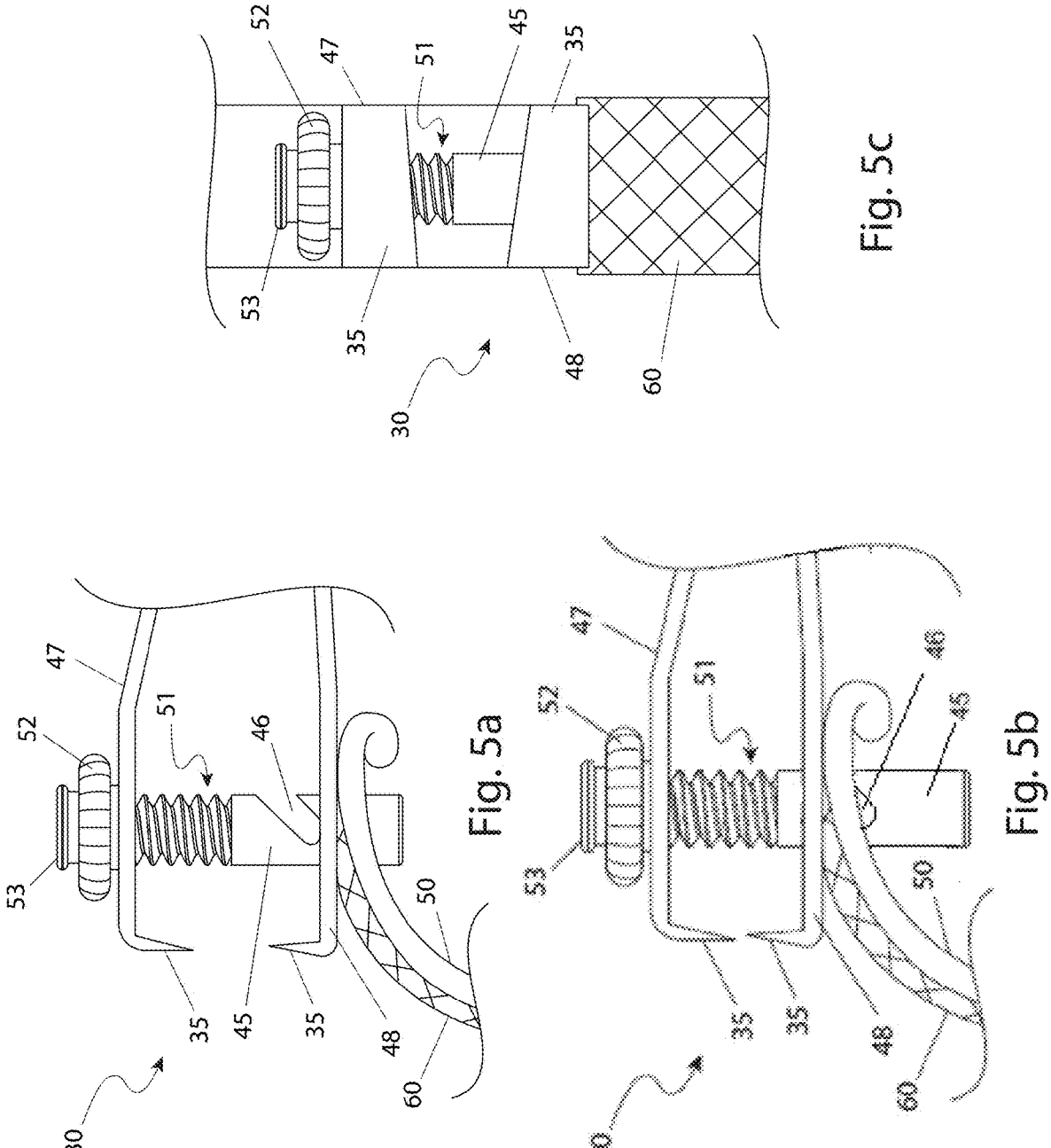
FIG. 5a is a close-up side view of the cutting blades 35 of the nail clipping mechanism 30 prior to a clipping force acting thereupon, according to the preferred embodiment of the present invention.
FIG. 5b is a close-up side view of the cutting blades 35 of the nail clipping mechanism 30 after a clipping force has acted thereupon, according to the preferred embodiment of the present invention.
FIG. 5c is a close-up front view of the cutting blades 35 of the nail clipping mechanism 30 prior to a clipping force acting thereupon, according to the preferred embodiment of the present invention.

The nail clipper 10 utilizes a nail clipping mechanism 30 that is forward-facing from the handle 15 and is made from hardened steel for long life. The nail clipping mechanism 30 is provided with two (2) cutting blades 35, each of which are coated with diamond powder, such that the cutting blades 35 smooths the nail while cutting it. The nail clipping mechanism 30 is operated by pull pin 45 which connects to a trigger clip activator 50 and activates the nail clipping mechanism 30 in a manner typically associated with conventional nail clippers, by squeezing the trigger clip activator 50 along an actuation travel path "d" 55. This action can be more closely seen in FIGS. 5*a* and 5*c* showing a "before" illustration and FIG. 5*b* showing an "after" illustration relative to a clipping force acting thereupon. The front leading cutting angles of the two (2) cutting blades 35 provide a shearing action to soften and smooth the resultant cut of the nail. It is also appreciated that the front leading cutting angles of the two (2) cutting blades 35 can have different geometries to provide a decorative resultant cut of the nail. The trigger clip activator 50 is provided with front anti-slip surface 60 to ensure safe and smooth operation by the user even with wet hands. During periods of non-use, the trigger clip activator 50 can rotate along a dual rotating travel path "b" 65 to facilitate storage of the trigger clip activator 50 up against the finger grip area 25.

To facilitate enhanced vision of the nail cutting process, a magnifying lens 70 is provided in a lens frame 75 directly over the cutting blades 35. The lens frame 75 is attached to a swing arm 80 via a first pivot point 85 which allows movement of the lens frame 75 along a lens travel path "a" 90. In turn, the swing arm 80 is attached to the handle 15 via a second pivot point 95. The second pivot point 95 allows the swing arm 80 as well as the lens frame 75 to travel along a travel path "c" 100, thus placing the swing arm 80 and lens frame 75 against the handle 15, thus presenting a low profile for storage. A first file storage location 105 and a second file storage location 110 provide for storage of a nail file 115 (not shown for purposes of clarity). The nail file 115 will be described in greater detail herein below. A snap-locking door 120, located on the bottom of the handle 15 immediately next to the rear anti-slip surface 20 provides access to an internal handle cavity 125 (not shown due to illustrative limitations), which will be described in greater detail herein below. A power switch 130 is located on the side of the handle 15 which controls battery-powered light-emitting diodes (LED's) 135 and will be described in greater detail herein below.

Figure 2:
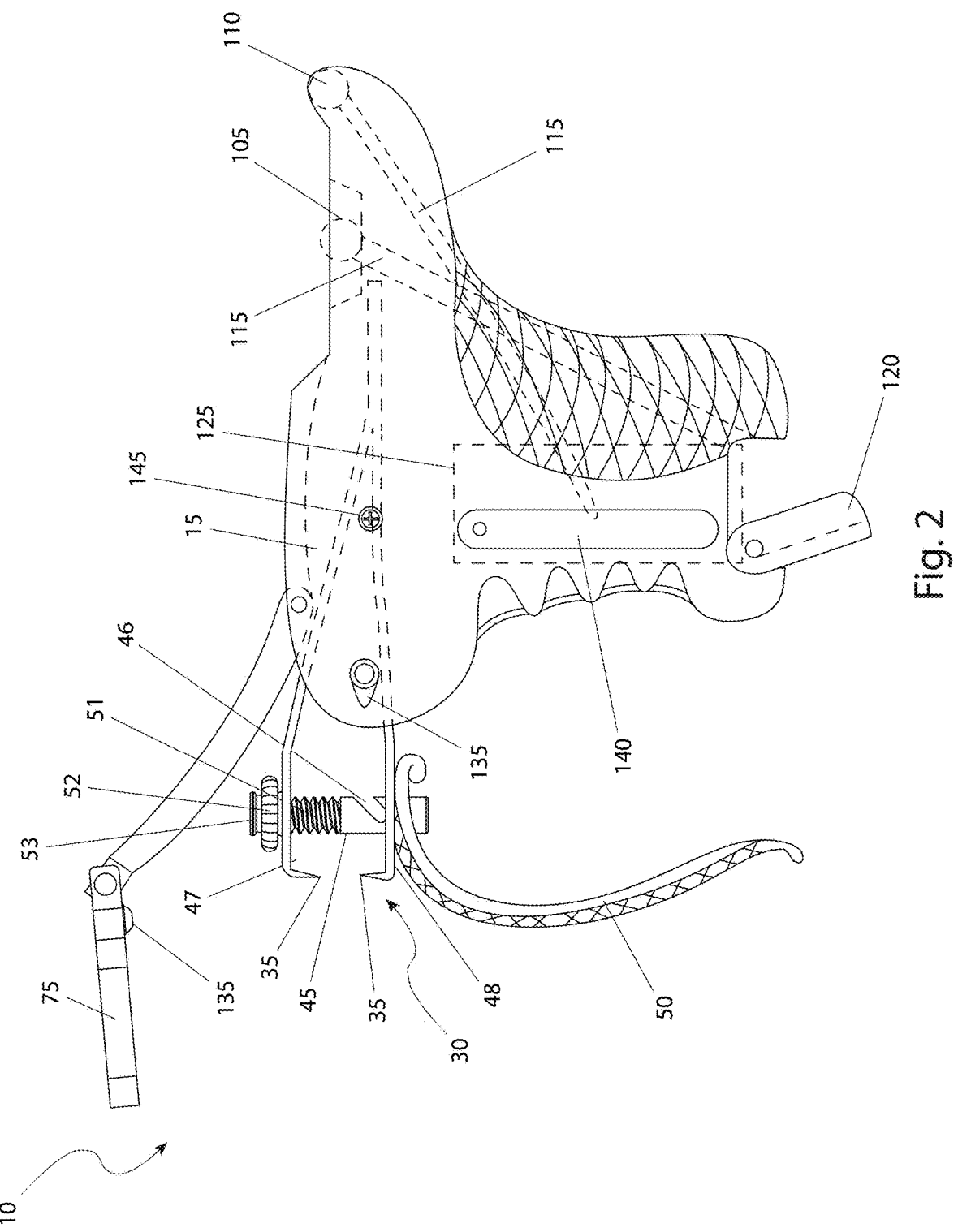
FIG. 2 is a sectional view of the nail clipper 10, as seen along a line I-I, as shown in FIG. 1, according to the preferred embodiment of the present invention.

Referring next to FIG. 2, a sectional view of the enhanced nail clipper 10, as seen along a line I-I, as shown in FIG. 1, according to the preferred embodiment of the present invention is depicted. The door 120 is shown in an open state and thus providing access to the internal handle cavity 125. A manicure tool 140 is shown inside of the internal handle cavity 125. The nail file 115 is shown in either the first file storage location 105 or the second file storage location 110. A screw 145 is utilized to hold the nail clipping mechanism 30 to the handle 15. Other locations may be utilized for the screw 145 to anchor the nail clipping mechanism 30 to the handle 15, and as such, the exact location of the screw 145 should not be interpreted as a limiting factor of the present invention. Two (2) LED's 135 are provided to illuminate the area around the cutting blades 35. A first LED 135 is located on the underside of the lens frame 75 or swing arm 80 to illuminate the area directly below the magnifying lens 70. A second LED 135 is located on an aft portion of a sidewall of the handle 15 to illuminate the area adjacent the cutting blades 35. The pull pin 45 is provided with a slot 46 to accommodate the trigger clip activator 50 in a conventional manner. The pull pin 45 passes through a hole in both the upper arm 47 and the lower arm 48. When the trigger clip activator is pulled along the travel path "d" 55, the upper arm 47 and the lower arm 48 will be pulled together thus completing the nail cutting action. The pull pin 45 is provided with a threaded section 51, envisioned to be a fine thread which accommodates a knurled thumbnut 52 on top of the upper arm 47. The thumbnut 52 allows for initial spacing of the upper arm 47 and the lower arm 48 prior to cutting. A retaining cap 53 prevents removal and possible loss of the thumbnut 52 should it be loosened to its extreme upper position. It is envisioned that the adjustability feature afforded by the thumbnut 52 will be especially beneficial when used on users with thick fingernails or toenails or used for trimming nails on pets such as dogs and cats.

Figure 3:
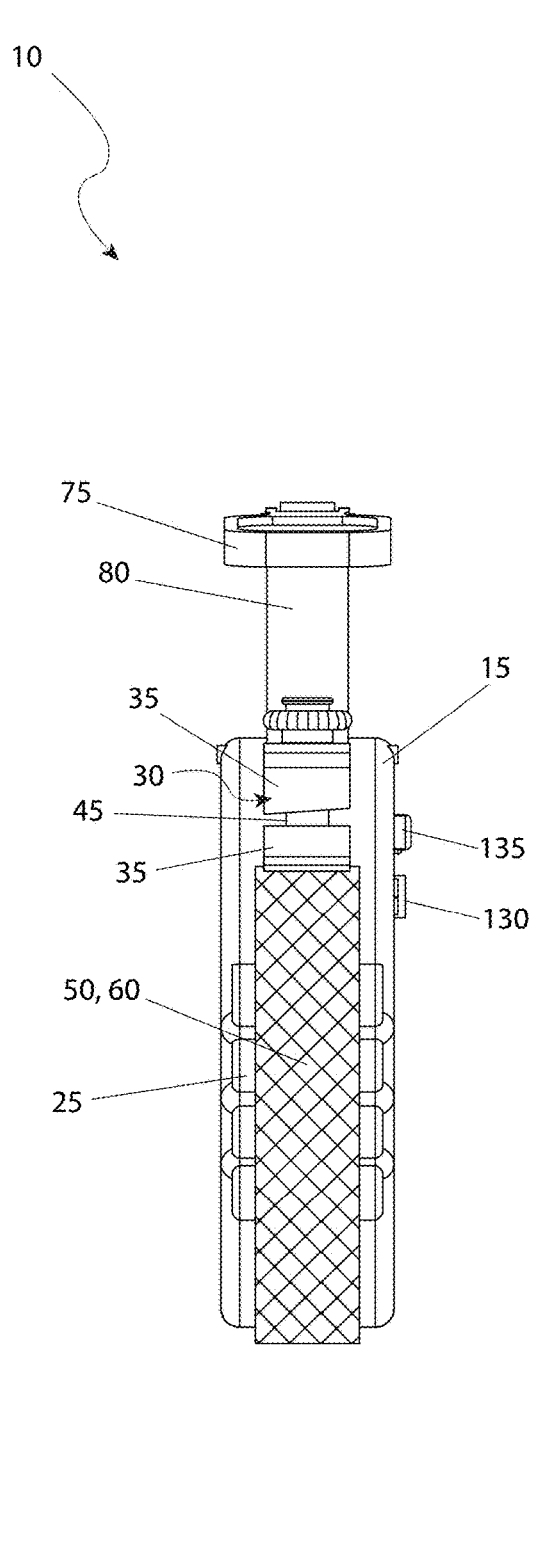
FIG. 3 is a front view of the nail clipper 10, according to the preferred embodiment of the present invention.

Referring now to FIG. 3, a front view of the enhanced nail clipper 10, according to the preferred embodiment of the present invention is shown. This view further clarifies the positional functionality of the lens frame 75 and the swing arm 80 with its ability to enhance vision of the cutting blades 35. The pull pin 45 is visible in between the cutting blades 35 whereupon it connects to the trigger clip activator 50 and the visible front anti-slip surface 60. The power switch 130 is visible on the side of the handle 15 while the finger grip area 25 is visible on the front of the handle 15.

Figure 4:
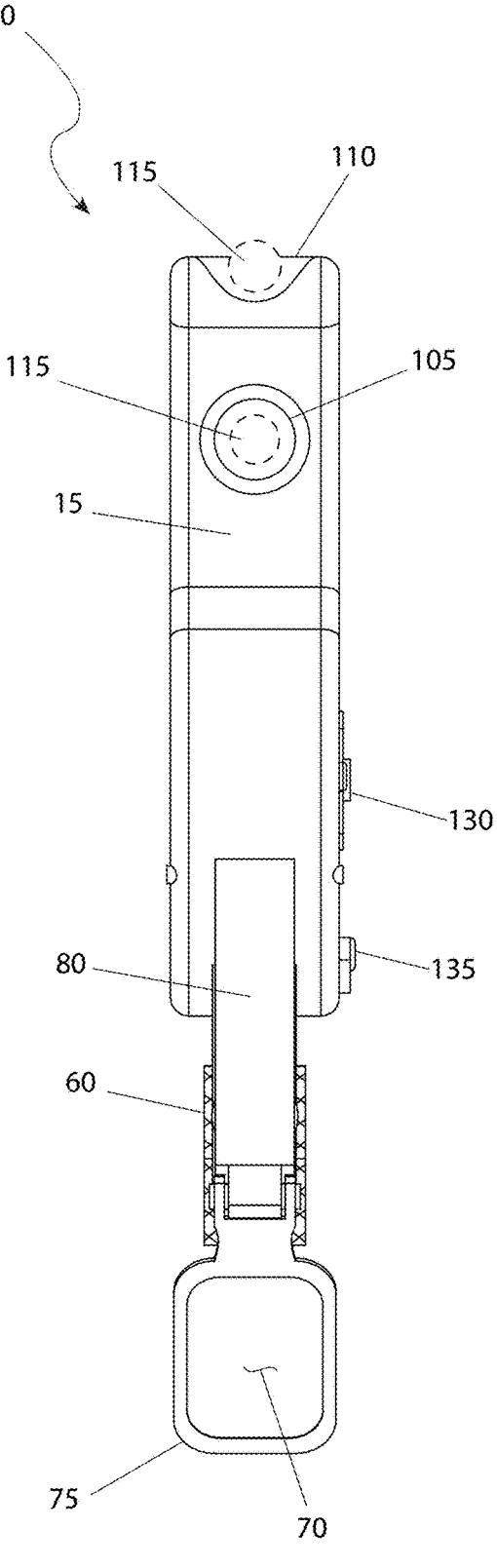
FIG. 4 is a top view of the nail clipper 10, according to the preferred embodiment of the present invention.

Referring next to FIG. 4, a top view of the enhanced nail clipper 10, according to the preferred embodiment of the present invention is disclosed. This view further clarifies the placement of the nail file 115 in either the first file storage location 105 or the second file storage location 110 on top of the handle 15, depending on the user's choice. The power switch 130 is also visible on the handle 15. The swing arm 80 thus provides a cantilever action to the lens frame 75 thus assuring that the magnifying lens 70 remains properly in place over the cutting blades 35 (not shown in this figure due to illustrative limitations). The front anti-slip surface 60 is visible as connected to the trigger clip activator 50 (not visible in this figure due to illustrative limitations).

Figure 6:
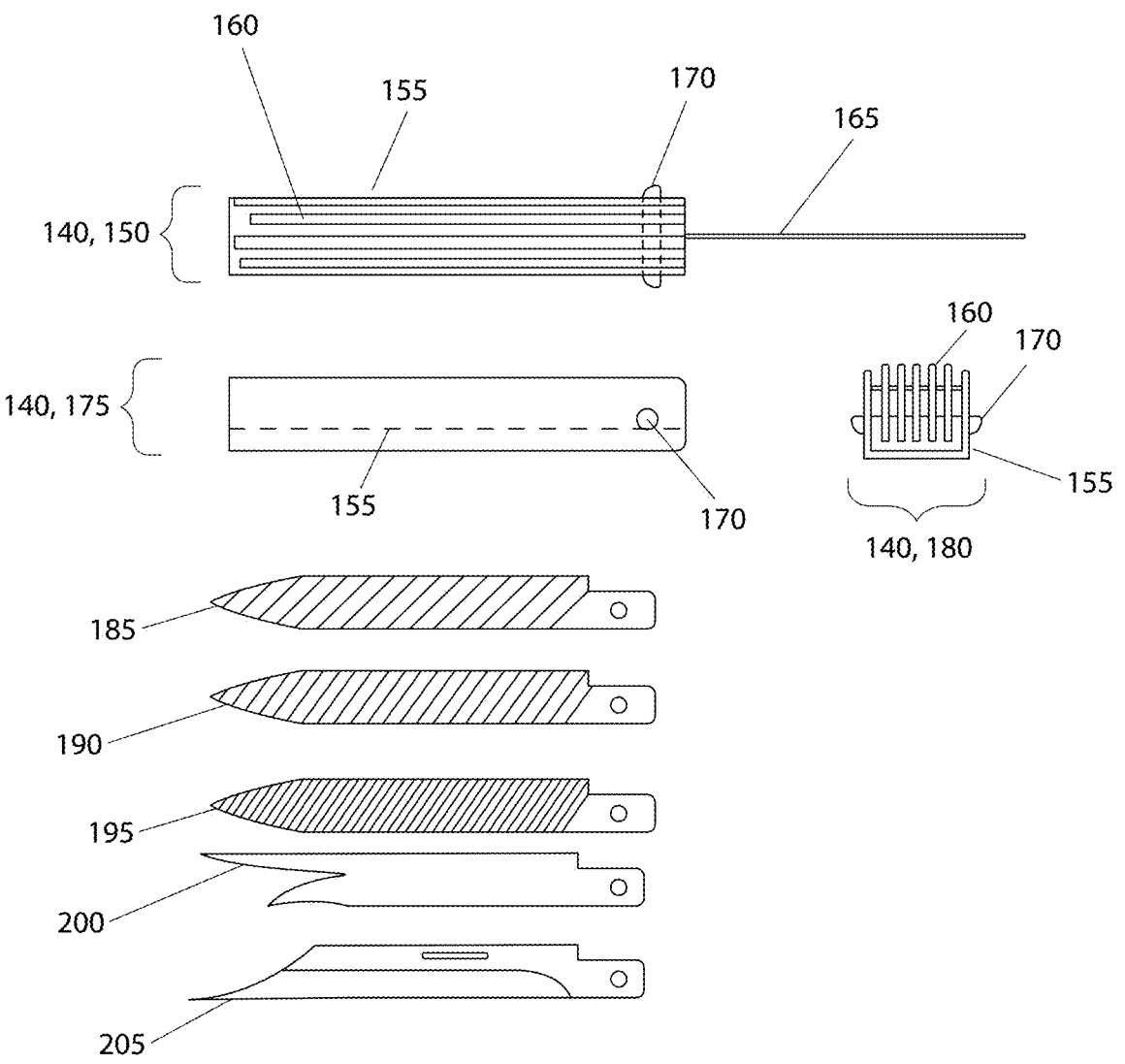
FIG. 6 is multiple views of the manicure tool 140, as used with the nail clipper 10, according to the preferred embodiment of the present invention.

Referring now to FIG. 6, multiple views of the manicure tool 140, as used with the enhanced nail clipper 10, according to the preferred embodiment of the present invention is depicted. A manicure tool top view 150 depicts a tool frame 155 holding multiple stored tools 160 along with at least one (1) deployed tool 165 held in place by a third pivoting point 170 in much the same manner as a pocket knife with multiple blades. A manicure tool side view 175 depicts the same manicure tool 140 with the tool frame 155, the stored tools 160 and the third pivoting point 170. A manicure tool end view 180 depicts the same manicure tool 140 with the tool frame 155, the stored tools 160 and the third pivoting point 170. The tools/blades included within the tool frame 155 may vary as dictated by user preferences. Blades/tools may include, but are not limited to: a coarse file 185, a medium file 190, a fine file 195, a pick tool 200, and/or a knife blade 205.

Figure 7:
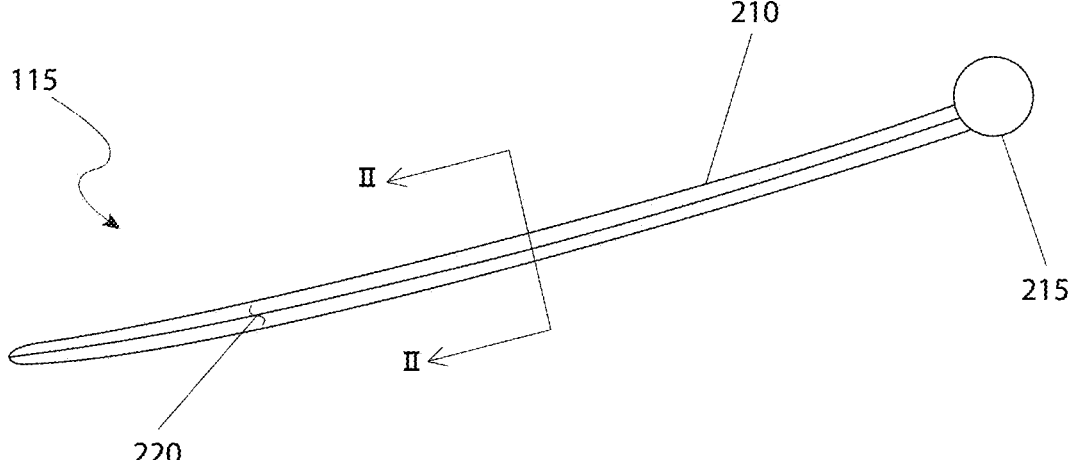
FIG. 7 is a side view of the nail file 115, as used with the nail clipper 10, according to the preferred embodiment of the present invention; and, FIG. 8 is a sectional view of the nail file 115, as seen along a line II-II, as shown in FIG. 6, according to the preferred embodiment of the present invention.

Referring next to FIG. 7, a side view of the nail file 115, as used with the enhanced nail clipper 10, according to the preferred embodiment of the present invention is shown. The nail file 115 has a file shaft 210 along with a file handle 215. The file shaft 210 is envisioned to be manufactured from carbon fiber, or similar strong, resulting, and flexible material such as plastic composites. All surfaces of the file shaft 210 are covered with various grades of abrasive grit coatings 220 such as necessary for coarse nail shaping and fine nail finishing.

Figure 8:
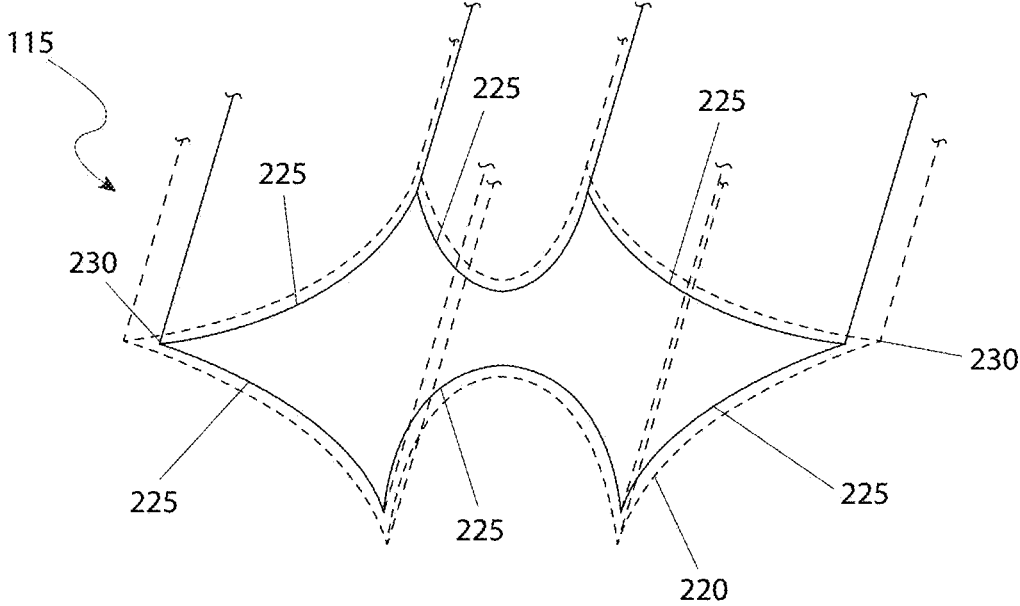

Referring to FIG. 8, a sectional view of the nail file 115, as seen along a line II-II, as shown in FIG. 7, according to the preferred embodiment of the present invention is disclosed. The file shaft 210 is provided with multiple concave surfaces 225 and pointed edges 230, all of which are coated with abrasive grit coatings 220 of various grades. The concave surfaces 225 are provided in different radiuses to accommodate nails of all thicknesses to allow the abrasive grit coatings 220 and the pointed edges 230 to be used for forming edge surfaces of nails.

2. OPERATION OF THE PREFERRED EMBODIMENT

The preferred embodiment of the present invention can be utilized by the common user in a simple and effortless manner with little or no training. It is envisioned that the nail clipper 10 would be constructed in general accordance with FIG. 1 through FIG. 8. The user would procure the enhanced nail clipper 10 from conventional procurement channels such as discount stores, department stores, health and beauty stores, medical equipment retailers, mail order and internet supply houses and the like.

After procurement and prior to utilization, the user would grasp the nail clipper 10 by the handle 15 in one (1) hand (either right or left); with the opposite hand, grasp the trigger clip activator 50, and rotate from a stored position (near the handle 15) to the usage position along the dual rotating travel path "b" 65. The user then can grasp the lens frame 75 and move it along the lens travel path "a" 90 and the travel path "c" 100 by the first pivot point 85 and the second pivot point 95. The user can activate either the first or the second LED 135 via the light power switch 130, hold the rear anti-slip surface 20 in the palm of a hand operating the nail clipper 10, and wrap a finger around the trigger clip activator 50 around the trigger clip activator 50. The cutting blades 35 are then positioned over the nail to be cut as verified through the magnifying lens 70 and the trigger clip activator 50 is squeezed, thus cutting the nail. The large trigger clip activator 50 is operated by all hand muscles, rather than just the muscles in the finger and the thumb as is the case with conventional clippers. As such, the nail clipper 10 is easier to use for the elderly, disabled, and those with diminished hand and finger strength. The above process would be repeated on all remaining hand and/or toe nails, switching hands as appropriate. Next, by opening the door 120, the user would access the manicure tool 140 and select one (1) of the proper stored tools 160 for deployment. The user would finish the nail grooming process by use of the manicure tool 140 and nail file 115 as appropriate.

After use of the nail clipper 10, the nail file 115 would be stored in either the first file storage location 105 or the second file storage location 110, the manicure tool 140 stored back in the internal handle cavity 125, the door 120 closed, and the trigger clip activator 50 rotated along the dual rotating travel path "b" 65, thus preparing the nail clipper 10 for storage. The nail clipper 10 may then be stored in a suitable location such as a pouch, bag, case, or holster.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A nail clipper, comprising:
a handle having a rear anti-slip surface and a finger grip area for enhanced user control;
a nail clipping mechanism connected to the handle, said mechanism comprising two cutting blades; diamond powder coated on said cutting blades to provide a smooth finish to clipped nails;
a trigger clip activator operatively connected to said nail clipping mechanism, configured to actuate along a first travel path;
a pull pin with a slot through which the trigger clip activator is engaged; and,
a threaded section on the pull pin, configured to receive a thumbnut for adjusting the spacing between the cutting blades; and,
wherein said nail clipper further includes a retaining cap on one end of said threaded section to prevent said thumbnut from unintentional removal from the threaded section, and said thumbnut facilitates cutting adjustments for thicker nails or pet nails.

2. The nail clipper of claim 1, further comprising:
a magnifying lens mounted in a lens frame, positioned above the cutting blades to enhance visibility;
a swing arm connected to the lens frame at a first pivot point and connected to the handle at a second pivot point, wherein the swing arm is configured to allow movement of the lens frame along a second travel path and a third travel path, enabling adjustable positioning and compact storage of the lens frame and the magnifying lens.

3. The nail clipper of claim 1, further comprising a power switch mounted on the handle, said power switch controlling a pair of light-emitting diodes positioned to illuminate a cutting area adjacent to the cutting blades, wherein:
a first light-emitting diode is positioned on the underside of the lens frame to illuminate the area below the magnifying lens, and,
a second light-emitting diode is positioned on a sidewall of the handle to provide additional illumination to the cutting area.

4. The nail clipper of claim 1, wherein the trigger clip activator further comprises a front anti-slip surface configured to facilitate user control during actuation in wet conditions.

5. The nail clipper of claim 1, wherein the handle further comprises:

a first file storage location and a second file storage location for storing a nail file; and, wherein said nail file includes a file shaft with various abrasive grit coatings for coarse to fine nail grooming, and the file shaft is equipped with concave surfaces and pointed edges to accommodate different nail thicknesses and grooming requirements.

6. The nail clipper of claim 1, further comprising a door positioned adjacent to the rear anti-slip surface, said door providing access to an internal handle cavity of the nail clipper configured to store a manicure tool.

7. The nail clipper of claim 6, wherein the manicure tool comprises a tool frame with multiple stored tools, each of the multiple stored tools pivotably mounted to the tool frame via a pivoting point, allowing for selective deployment of said multiple stored tools, including:

a coarse file, a medium file, a fine file, a pick tool, and a knife blade, all of which are interchangeable and provide varied grooming functions.

8. The nail clipper of claim 1, wherein the trigger clip activator is configured to rotate along a dual rotating travel path, allowing for positioning adjacent to the finger grip area to facilitate compact storage when the nail clipper is not in use.

9. The nail clipper of claim 1, further comprising a lens frame and a swing arm, wherein:

the lens frame is moveable along a first travel path and a second travel path, said paths defined by a first pivot point and a second pivot point of the swing arm, enabling precise positioning of a magnifying lens above the cutting blades.

\* \* \* \* \*